(12) United States Patent
Chae et al.

(10) Patent No.: US 7,497,762 B2
(45) Date of Patent: Mar. 3, 2009

(54) APPARATUS AND METHOD FOR CORRECTING GRINDING AMOUNT OF LIQUID CRYSTAL DISPLAY PANEL

(75) Inventors: Kyung-Su Chae, Daegu (KR); Sang-Sun Shin, Kyoungsangbuk-Do (KR); Jong-Go Lim, Kyoungsangbok-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/260,570

(22) Filed: Oct. 1, 2002

(65) Prior Publication Data
US 2003/0190862 A1 Oct. 9, 2003

(30) Foreign Application Priority Data
Mar. 21, 2002 (KR) .............................. 2002-15455

(51) Int. Cl.
*B24B 1/00* (2006.01)
*B24B 49/00* (2006.01)
(52) U.S. Cl. .................................. 451/6; 451/8; 451/41
(58) Field of Classification Search ...................... 451/5, 451/6, 8, 41
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki | |
| 4,775,225 A | 10/1988 | Tsuboyama et al. | |
| 4,848,040 A * | 7/1989 | Nishino .......................... 451/5 |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,604,583 A * | 2/1997 | Byron et al. ................. 356/124 |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |

(Continued)

FOREIGN PATENT DOCUMENTS

EP  1 003 066 A1  5/2000

(Continued)

*Primary Examiner*—Maurina Rachuba
(74) *Attorney, Agent, or Firm*—McKenna Long & Aldridge LLP

(57) ABSTRACT

In an apparatus and a method for correcting a grinding amount of a unit liquid crystal display panel, by grinding an edge of a unit liquid crystal display panel; generating grinding pictures of the unit liquid crystal display panel; calculating an error value by comparing the grinding pictures with a reference picture; and changing a set value of a grinding unit according to the error value. In addition, by disposing a grinding amount correcting apparatus in a grinding apparatus, correcting a grinding amount of a unit liquid crystal display panel can be performed by an automatic system.

3 Claims, 6 Drawing Sheets

U.S. PATENT DOCUMENTS

| | | | |
|---|---|---|---|
| 5,854,664 A | 12/1998 | Inoue et al. | |
| 5,861,932 A | 1/1999 | Inata et al. | |
| 5,875,922 A | 3/1999 | Chastine | |
| 5,952,676 A | 9/1999 | Sato et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,102,775 A | 8/2000 | Ushio et al. | |
| 6,163,357 A | 12/2000 | Nakamura | |
| 6,219,126 B1 | 4/2001 | von Gutfeld | |
| 6,222,603 B1 | 4/2001 | Sakai et al. | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami | |
| 6,337,730 B1 | 1/2002 | Ozaki et al. | |
| 6,414,733 B1 | 7/2002 | Ishikawa et al. | |
| 6,547,616 B1* | 4/2003 | Furukawa et al. | 445/24 |
| 6,551,172 B1 | 4/2003 | Nyui et al. | |
| 6,825,897 B2* | 11/2004 | Chae et al. | 349/94 |
| 6,881,130 B1* | 4/2005 | Stocker | 451/44 |
| 2003/0223030 A1* | 12/2003 | Byun et al. | 349/187 |
| 2004/0001177 A1* | 1/2004 | Byun et al. | 349/187 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 57038414 | 3/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | 3-202272 | 9/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 5-185360 | 7/1993 |
| JP | 05-265011 | 10/1993 |
| JP | 5-277925 A | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 6-312342 | 11/1994 |
| JP | 06-312342 A | 11/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 8-174415 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 10-123537 | 5/1998 |
| JP | 10-123538 | 5/1998 |
| JP | 10-142616 | 5/1998 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |

| | | | | | |
|---|---|---|---|---|---|
| JP | 10-221700 | 8/1998 | JP | 2001-209057 | 8/2001 |
| JP | 10221700 | 8/1998 | JP | 2001-209058 | 8/2001 |
| JP | 10-282512 | 10/1998 | JP | 2001-209060 | 8/2001 |
| JP | 10282512 | 10/1998 | JP | 2001-215459 | 8/2001 |
| JP | 10-294297 | 11/1998 | JP | 2001-222017 | 8/2001 |
| JP | 10-333157 | 12/1998 | JP | 2001-235758 | 8/2001 |
| JP | 10-333159 | 12/1998 | JP | 2001-255542 | 9/2001 |
| JP | 11-014953 | 1/1999 | JP | 2001-264782 | 9/2001 |
| JP | 11014953 | 1/1999 | JP | 2001255542 | 9/2001 |
| JP | 11-038424 | 2/1999 | JP | 2001264782 | 9/2001 |
| JP | 11038424 | 2/1999 | JP | 2001-272640 | 10/2001 |
| JP | 11-064811 | 3/1999 | JP | 2001-281675 | 10/2001 |
| JP | 11064811 | 3/1999 | JP | 2001-281678 | 10/2001 |
| JP | 11-109388 | 4/1999 | JP | 2001-282126 | 10/2001 |
| JP | 11109388 | 4/1999 | JP | 2001-305563 | 10/2001 |
| JP | 11-133438 | 5/1999 | JP | 2001-330837 | 11/2001 |
| JP | 11-142864 | 5/1999 | JP | 2001-330840 | 11/2001 |
| JP | 11-151647 | 6/1999 | JP | 2001330840 | 11/2001 |
| JP | 11-174477 | 7/1999 | JP | 2001-356353 | 12/2001 |
| JP | 11-198033 | 7/1999 | JP | 2001-356354 | 12/2001 |
| JP | 11174477 | 7/1999 | JP | 2001356354 | 12/2001 |
| JP | 11-212045 | 8/1999 | JP | 2002-014360 | 1/2002 |
| JP | 11212045 | 8/1999 | JP | 2002-023176 | 1/2002 |
| JP | 11-248930 | 9/1999 | JP | 2002014360 | 1/2002 |
| JP | H11-262712 | 9/1999 | JP | 2002023176 | 1/2002 |
| JP | H11-264991 | 9/1999 | JP | 2002-049045 | 2/2002 |
| JP | 11-326922 | 11/1999 | JP | 2002049045 | 2/2002 |
| JP | 11-344714 | 12/1999 | JP | 2002-079160 | 3/2002 |
| JP | 11344714 | 12/1999 | JP | 2002-080321 | 3/2002 |
| JP | 2000-002879 | 1/2000 | JP | 2002-082340 | 3/2002 |
| JP | 2000-029035 | 1/2000 | JP | 2002-090759 | 3/2002 |
| JP | 2000029035 | 1/2000 | JP | 2002-090760 | 3/2002 |
| JP | 2000-056311 | 2/2000 | JP | 2002082340 | 3/2002 |
| JP | 2000-066165 | 3/2000 | JP | 2002090759 | 3/2002 |
| JP | 2000-066218 | 3/2000 | JP | 2002090760 | 3/2002 |
| JP | 2000-093866 | 4/2000 | JP | 2002-107740 | 4/2002 |
| JP | 2000-137235 | 5/2000 | JP | 2002-122870 | 4/2002 |
| JP | 2000-147528 | 5/2000 | JP | 2002-122872 | 4/2002 |
| JP | 2000-180808 A | 6/2000 | JP | 2002-122873 | 4/2002 |
| JP | 2000-193988 | 7/2000 | JP | 2002107740 | 4/2002 |
| JP | 2000-241824 | 9/2000 | JP | 2002122872 | 4/2002 |
| JP | 2000-284295 | 10/2000 | JP | 2002122873 | 4/2002 |
| JP | 2000-292799 | 10/2000 | JP | 2002-131762 | 5/2002 |
| JP | 2000-310759 | 11/2000 | JP | 2002-139734 | 5/2002 |
| JP | 2000-310784 | 11/2000 | JP | 2002-156518 | 5/2002 |
| JP | 2000-338501 | 12/2000 | JP | 2002-169166 | 6/2002 |
| JP | 2001-005401 | 1/2001 | JP | 2002-169167 | 6/2002 |
| JP | 2001-005405 | 1/2001 | JP | 2002-182222 | 6/2002 |
| JP | 2001-013506 | 1/2001 | JP | 2002080321 | 6/2002 |
| JP | 2001-033793 | 2/2001 | JP | 2002-202512 | 7/2002 |
| JP | 2001-042341 | 2/2001 | JP | 2002-202514 | 7/2002 |
| JP | 2001-051284 | 2/2001 | JP | 2002-214626 | 7/2002 |
| JP | 2001-066615 | 3/2001 | JP | 2002202512 | 7/2002 |
| JP | 2001-091727 | 4/2001 | JP | 2002202514 | 7/2002 |
| JP | 2001-117105 | 4/2001 | JP | 2002214626 | 7/2002 |
| JP | 2001-117109 | 4/2001 | JP | 2002-229042 | 8/2002 |
| JP | 2001117105 | 4/2001 | JP | 2002-236276 | 8/2002 |
| JP | 2001-133745 | 5/2001 | JP | 2002-258299 | 8/2002 |
| JP | 2001-133794 | 5/2001 | JP | 2002-236292 | 9/2002 |
| JP | 2001-133799 | 5/2001 | JP | 2002-277865 | 9/2002 |
| JP | 2001-142074 | 5/2001 | JP | 2002-277866 | 9/2002 |
| JP | 2001-147437 | 5/2001 | JP | 2002-277881 | 9/2002 |
| JP | 2001133794 | 5/2001 | JP | 2002-287156 | 10/2002 |
| JP | 2001142074 | 5/2001 | JP | 2002-296605 | 10/2002 |
| JP | 2001147437 | 5/2001 | JP | 2002-311438 | 10/2002 |
| JP | 2001-154211 | 6/2001 | JP | 2002-311440 | 10/2002 |
| JP | 2001-166272 | 6/2001 | JP | 2002-311442 | 10/2002 |
| JP | 2001-166310 | 6/2001 | JP | 2002-323687 | 11/2002 |
| JP | 2001154211 | 6/2001 | JP | 2002-323694 | 11/2002 |
| JP | 2001-183683 | 7/2001 | JP | 2002-333628 | 11/2002 |
| JP | 2001-201750 | 7/2001 | JP | 2002-333635 | 11/2002 |
| JP | 2001-209052 | 8/2001 | JP | 2002-333843 | 11/2002 |
| JP | 2001-209056 | 8/2001 | JP | 2002-341329 | 11/2002 |

| | | | | | | |
|---|---|---|---|---|---|---|
| JP | 2002-341355 | 11/2002 | | JP | 2002-341362 | 11/2002 |
| JP | 2002-341356 | 11/2002 | | JP | 2003-251551 | 9/2003 |
| JP | 2002-341357 | 11/2002 | | KR | 2000-0035302 | 6/2000 |
| JP | 2002-341358 | 11/2002 | | | | |
| JP | 2002-341359 | 11/2002 | | | | |

* cited by examiner

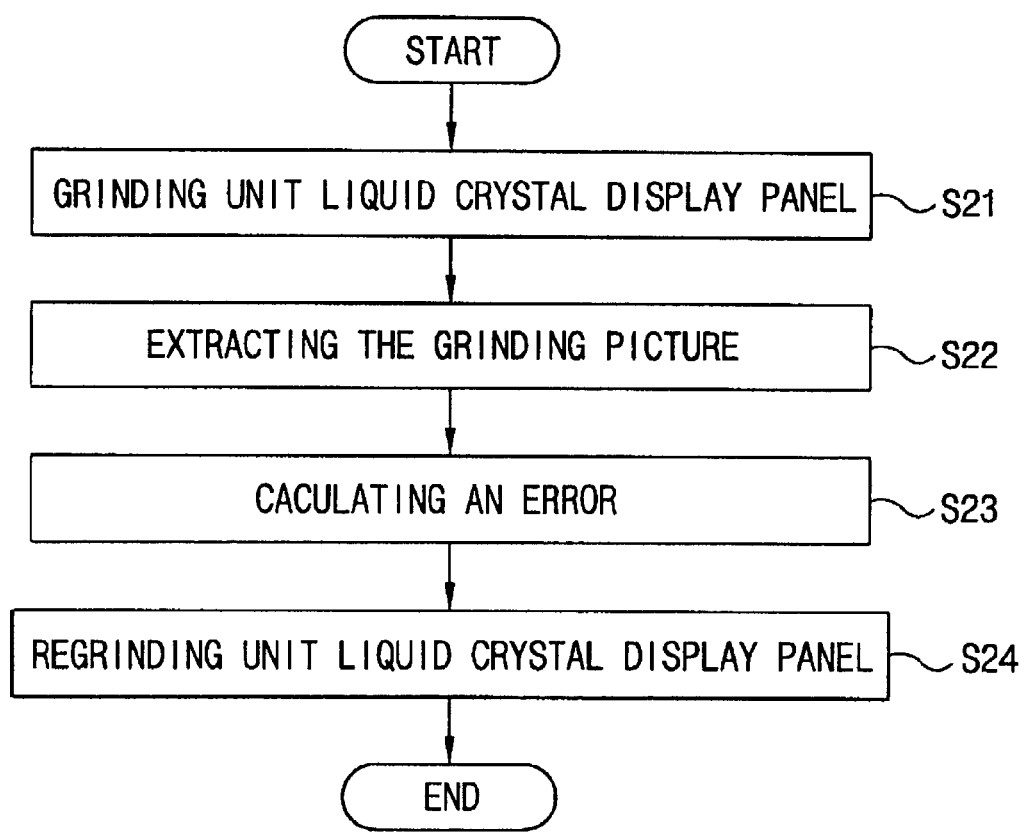

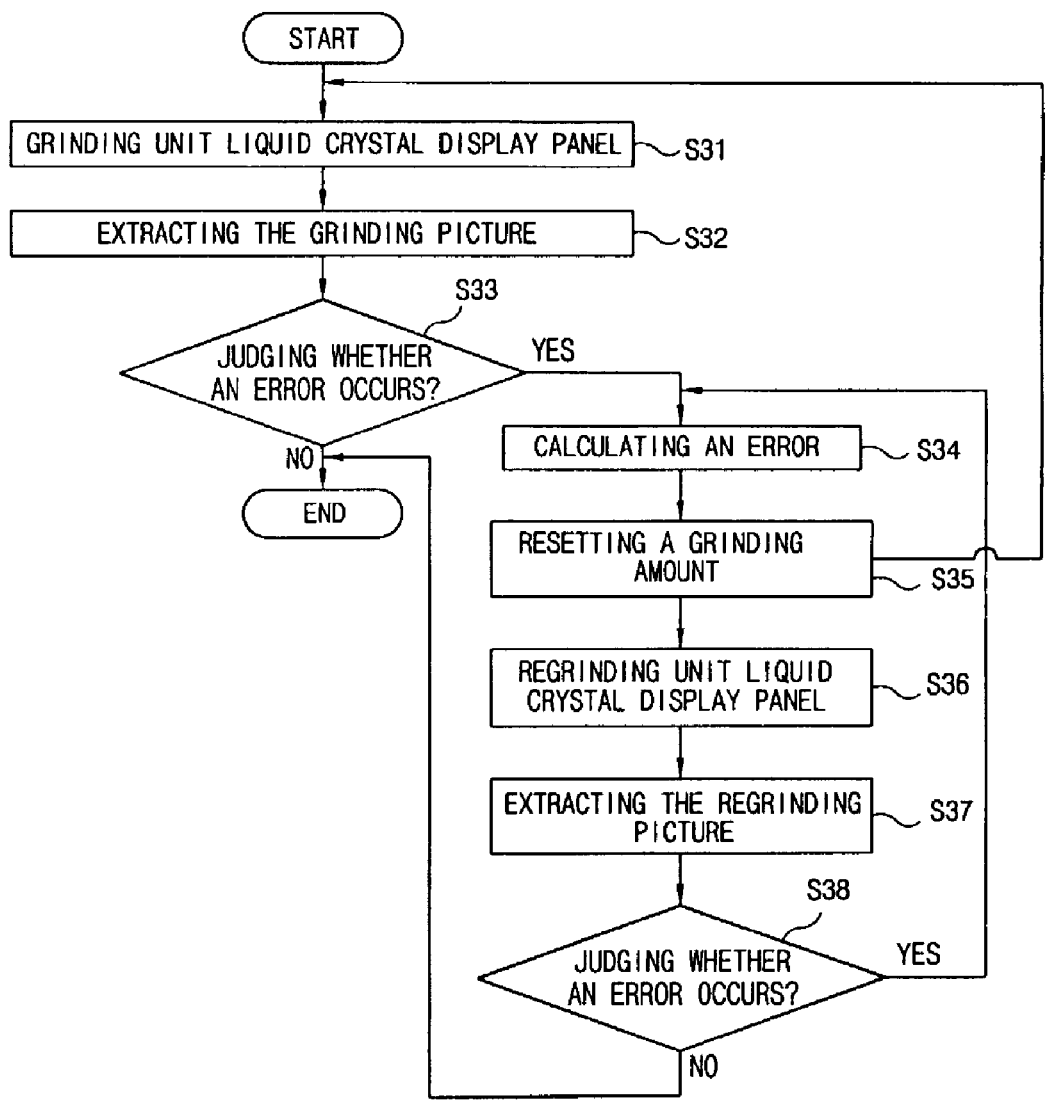

APPARATUS AND METHOD FOR CORRECTING GRINDING AMOUNT OF LIQUID CRYSTAL DISPLAY PANEL

This application claims the benefit of Korean Patent Application No. 2002-15455, filed on Mar. 21, 2002, which is hereby incorporated by reference for all purposes as if fully set forth herein.

BACKGROUND OF THE INVENTION

1. Field of the Invention

The present invention relates to an apparatus and a method for correcting a grinding amount of a liquid crystal display panel. In more detail, in cutting liquid crystal display panels formed on a mother substrate having large area into individual unit liquid crystal display panels and grinding the edge of each unit liquid crystal display panel, the present invention relates to an apparatus and a method for correcting a grinding amount of a liquid crystal display panel capable of facilitating measurement and correction of a grinding amount thereof.

2. Discussion of the Related Art

Generally, in a liquid crystal display device, because plural liquid crystal display panels are simultaneously formed by forming thin film transistor array substrates onto a mother substrate having large area, forming color filter substrates onto an another mother substrate and adhering the two mother substrates to each other in order to improve an yield rate, a process for cutting the formed liquid crystal display panels in unit liquid crystal display panels is required.

In general, in cutting of liquid crystal display panels, a predetermined cutting line is formed at the surface of the mother substrate by a wheel having a higher hardness than glass, and a crack is spread through the predetermined cutting line. The liquid crystal display panel will be described in more detail with reference to accompanying drawings.

FIG. 1 is an exemplary view illustrating a sectional view of multiple liquid crystal display panels fabricated by attaching a first mother substrate having thin film transistor array substrates to a second mother substrate having color filter substrates.

As shown in FIG. 1, in the unit liquid crystal display panels, a certain side of the thin film transistor array substrate 1 for a unit cell projects in comparison with the color filter substrate 2. It is because a gate pad portion (not shown) and a data pad portion (not shown) which do not correspond to the range of the color filter substrate 2, are formed at the edge of the thin film transistor array substrate 1.

Accordingly, in forming of the color filter substrate 2 onto the second mother substrate 30, there is a dummy region 31 corresponding to the protrusion area of the thin film transistor array substrate 1 formed on the first mother substrate 20.

In addition, each unit liquid crystal display panel is arranged to use the first and second mother substrates 20, 30 to the utmost i.e., to optimize the use of the area of the mother substrates. It may be differentiated according to models, however, generally each unit liquid crystal display panel is separated from each other as a dummy region 32 in arrangement.

After adhering the first mother substrate 1 to the second mother substrate 2, the unit liquid crystal display panels are respectively cut. In the cutting process the dummy region 31 corresponding to the protrusion area of the array substrate 1 and the dummy region 32 for separating each unit liquid crystal display panel are simultaneously removed.

FIG. 2 is a schematic exemplary view illustrating a plan view of a unit liquid crystal display panel.

As shown in FIG. 2, a unit liquid crystal display panel 10 includes a picture display unit 13 on which liquid crystal cells are arranged as a matrix shape; a gate pad unit for connecting gate line (GL1 to GLm) of the picture display unit 13 with a gate driver integrated circuit (IC) (not shown) for receiving gate signals; and a data pad unit 15 for connecting data line (DL1 to DLn) of the picture display unit 13 with a data driver integrated circuit (IC) (not shown) for receiving picture information. Herein, the gate pad unit 14 and the data pad unit 15 are formed at the edge of the thin film transistor array substrate 1 having protrusions along short and long sides (in comparison with the color filter substrate 2).

Although not shown in detail in drawings, each thin film transistor for switching liquid cells in the unit liquid crystal display panel is installed at a region in which a data line (DL1 to DLn) vertically crosses a gate line (GL1 to GLm). Each pixel electrode for applying an electric field to the liquid cells contacts a respective thin film transistor. A protection layer for protecting the data line (DL1 to DLn), the gate line (GL1 to GLm), the thin film transistors and the electrodes is formed over the entire surface.

A plurality of color filters are formed on the color filter substrate 2 cell regions are separated with a black matrix. Common electrodes, which are opposite electrodes of the pixel electrodes, are formed onto the thin film transistor array substrate 1.

The thin film transistor array substrate 1 and the color filter substrate 2, are separated by a cell-gap in order to have a uniform clearance there between. The substrates 1, 2 are adhered to each other by a sealant (not shown) formed at the edge of the picture display unit 13, and a liquid crystal layer (not shown) is formed in a space (cell-gap) between the thin film transistor array substrate 1 and the color filter substrate 2.

In the meantime, shorting bar (not shown) is formed at the edge of the thin film transistor array substrate 1 in order to cut off static electricity generated in patterning conductive layers on the thin film transistor array substrate 1. The shorting bar has to be removed after cutting the liquid crystal display panels in unit liquid crystal display panels.

Accordingly, after cutting the liquid crystal display panels into unit liquid crystal display panels, the shorting bar is removed by grinding the edge of the unit liquid crystal display panel. In addition, by grinding the edge of the unit liquid crystal display panel, it is possible to prevent the edge of the unit liquid crystal display panel from being broken or separating and to prevent a worker from being injured by the sharp edge of the unit liquid crystal display panel in the process.

The grinding process of the unit liquid crystal display panel will be described in detail with reference to accompanying drawings.

FIG. 3 is an exemplary view illustrating a general grinding apparatus for a liquid crystal display panel. As shown in FIG. 3, a general grinding apparatus for a liquid crystal display panel includes a loading unit 50 for loading a cut unit liquid crystal display panel 10; a grinding unit 53 for receiving the unit liquid crystal display panel 10 from the loading unit 50, and arranging the unit liquid crystal display panel 10 on a grinding board 51 and grinding the edge of the unit liquid crystal display panel 10 with a grinding wheel 52 rotating at the high speed; and an unloading unit 54 for receiving the ground unit liquid crystal display panel 10 from the grinding unit 53 and unloading the unit liquid crystal display panel 10.

FIG. 4 is a flow chart illustrating a method for correcting a grinding amount of the unit liquid crystal display panel 10 ground through the grinding apparatus in FIG. 3.

As shown in FIG. 4, the method includes grinding a unit liquid crystal display panel (S11); removing the ground unit liquid crystal display panel from the grinding apparatus and transferring it to an outside measuring apparatus (S12); measuring a grinding amount of the unit liquid crystal display panel (S13); returning the unit liquid crystal display panel to the grinding apparatus (S14); changing a set value of the grinding apparatus by calculating an error between the measured grinding amount and a reference value (S15); and regrinding the unit liquid crystal display panel by using the changed set value of the grinding apparatus (S16).

The related art methods for measuring and correcting the grinding amount of the liquid crystal display panel will be described in more detail.

First, the edge of the unit liquid crystal display panel 10 is ground through the grinding apparatus in FIG. 3 as shown at step S11.

And, the unit liquid crystal display panel 10 is taken out and transferred to the outside measuring apparatus as shown at step S12.

Herein, in order to take out and transfer the unit liquid crystal display panel 10, a worker has to take the unit liquid crystal display panel 10 out from the grinding apparatus and transfer it to the measuring apparatus manually. The work is intricate, and the unit liquid crystal display panel 10 is exposed to external impact.

Afterward, the grinding amount of the unit liquid crystal display panel 10 is measured as shown at step S13.

Herein, in general, because the worker measures the grinding amount of the unit liquid crystal display panel 10 with the naked eye through a screen of a projector, reliability of measuring is lowered.

Also, the unit liquid crystal display panel 10 is taken out from the measuring apparatus and transferred to the grinding apparatus as shown at step S14.

In addition to problems in transferring the unit liquid crystal display panel 10 to the measuring apparatus, in returning of the unit liquid crystal display panel 10 to the grinding apparatus, the worker has to take out the unit liquid crystal display panel 10 from the measuring apparatus and transfer it to the grinding apparatus manually. The work is similarly intricate and the unit liquid crystal display panel 10 is exposed to external impact.

After calculating an error between the grinding amount measured value of the unit liquid crystal display panel 10 and a reference value, a set value of the grinding apparatus is changed as shown at step S15.

To calculate an error between the grinding amount measured value of the unit liquid crystal display panel 10 and the reference value, because the worker memorizes or writes down the measured value and compares the measured value with the reference value after returning the unit liquid crystal display panel 10 to the grinding apparatus, the measured value may be changed due to mistake of the worker.

In addition, because the worker has to change a set value of the grinding apparatus for each item, e.g., each unit liquid crystal display panel, it is intricate.

By applying the changed set value, the unit liquid crystal display panel 10 is reground as shown at step S16.

Accordingly, as shown in FIG. 5, in the related art apparatus and method, the grinding apparatus 60 and the measuring apparatus 70 are separated from each other. In order to measure and correct a grinding amount after grinding a unit liquid crystal display panel, the unit liquid crystal display panel has to be transferred and returned between the grinding and measuring apparatus as 60, 70, and accordingly the operation processes are intricate. In addition, the unit liquid crystal display panel is exposed to external impact, and reliability of grinding amount is lowered.

As described above, in the related art apparatus and method for correcting the grinding amount of the liquid crystal display panel, in order to take out, transfer and return the unit liquid crystal display panel 10, the worker has to perform all those processes manually, and accordingly the work is intricate and the unit liquid crystal display panel is exposed to external impacts.

In addition, by measuring a grinding amount of a unit liquid crystal display panel with the naked eye through a projector, reliability of measuring is lowered. Also, because the worker memorizes or writes down the measured value and compares it with the reference value after returning the unit liquid crystal display panel to the grinding apparatus, the measured value may be obtained differently due to mistake of the worker.

In addition, because the worker has to change a set value of the grinding apparatus for each item through an error between a grinding amount measured value and a reference value, it is intricate.

SUMMARY OF THE INVENTION

Accordingly, the present invention is directed to apparatus and method for correcting grinding amount of a liquid crystal display panel that substantially obviates one or more of the problems due to limitations and disadvantages of the related art.

In order to solve the above-mentioned problems, it is an advantage of the present invention to provide an apparatus and a method for correcting a grinding amount of a liquid crystal display panel that are capable of simplifying and improving reliability of a grinding amount correction by performing a grinding amount correction in a grinding apparatus with an automatic system.

First, in order to achieve the above-mentioned object, an apparatus for correcting a grinding amount of a liquid crystal display panel includes a grinding unit grinding an edge of a unit liquid crystal display panel; a camera generating a grinding picture of the unit liquid crystal display panel; a first memory unit storing the grinding picture and a second memory unit storing a reference picture; a comparing unit comparing the grinding picture with the reference picture and calculating an error value; and a control unit changing a set value of the grinding unit according to the error value.

And, in order to achieve the above-mentioned object, a method for correcting a grinding amount of a liquid crystal display panel includes grinding an edge of a unit liquid crystal display panel; generating grinding pictures of the unit liquid crystal display panel; calculating an error value by comparing the grinding pictures with a reference picture; and changing a set value of a grinding unit according to the error value.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a flow chart illustrating a method for correcting a grinding amount of a liquid crystal display panel in accordance with an embodiment of the present invention.

FIG. 8 is a flow chart illustrating a method for correction a grinding amount of a liquid crystal display panel in accordance with another embodiment of the present invention.

DETAILED DESCRIPTION OF THE ILLUSTRATED EMBODIMENTS

Reference will now be made in detail to embodiments of the present invention, examples of which are illustrated in the accompanying drawings.

Figure 1:
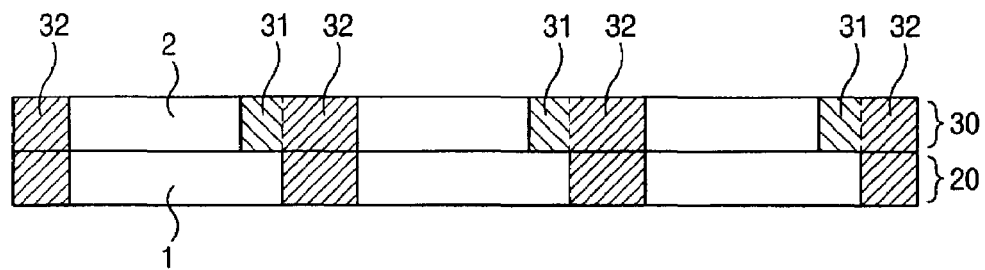
FIG. 1 is an exemplary view illustrating a sectional view of multiple liquid crystal display panels fabricated by attaching a first mother substrate having thin film transistor array substrates to a second mother substrate having color filter substrates.
Figure 2:
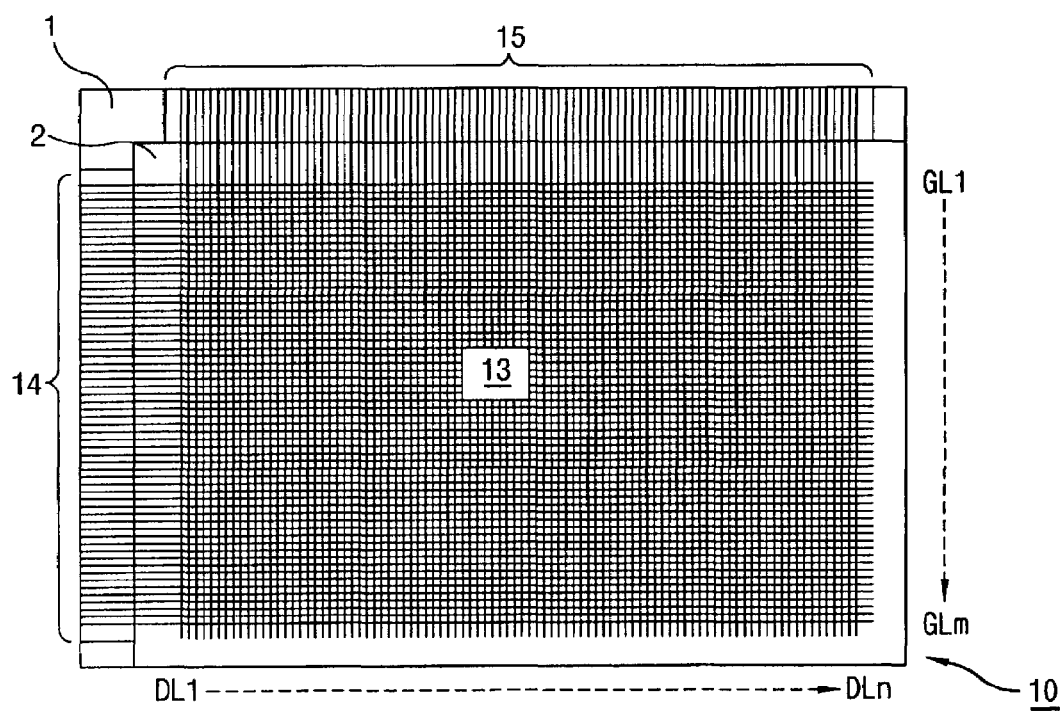
FIG. 2 is a schematic exemplary view illustrating a plane structure of a unit liquid crystal display panel.
Figure 3:
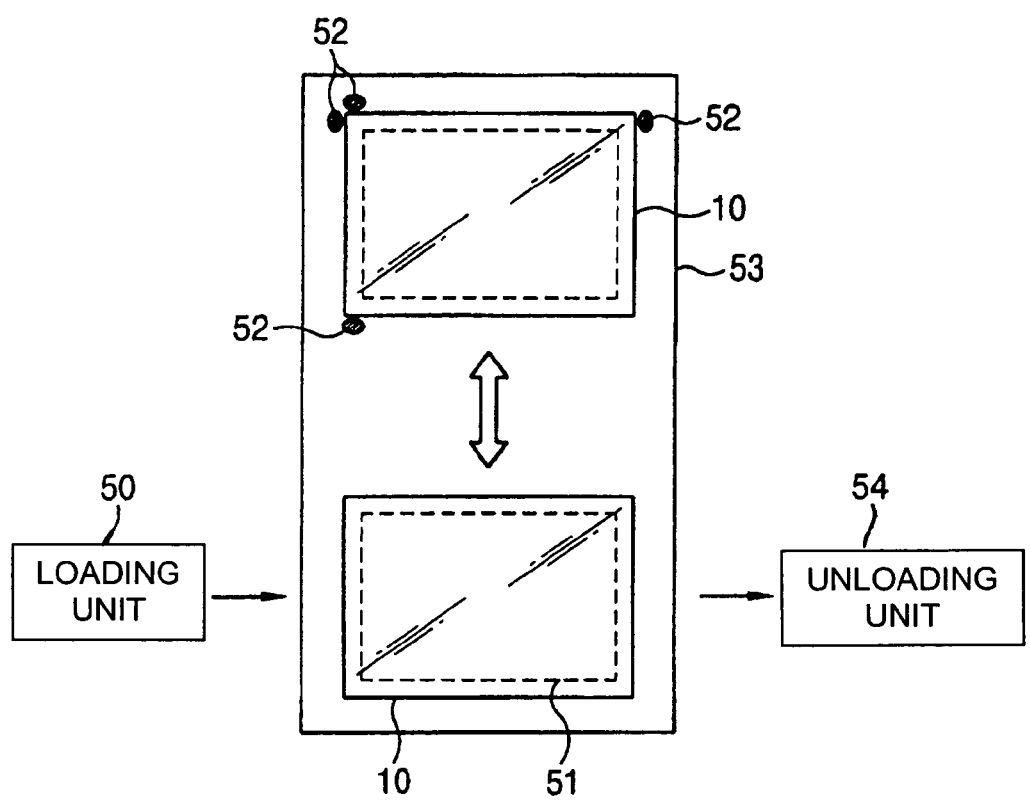
FIG. 3 is an exemplary view illustrating a general grinding apparatus for a liquid crystal display panel.
Figure 4:
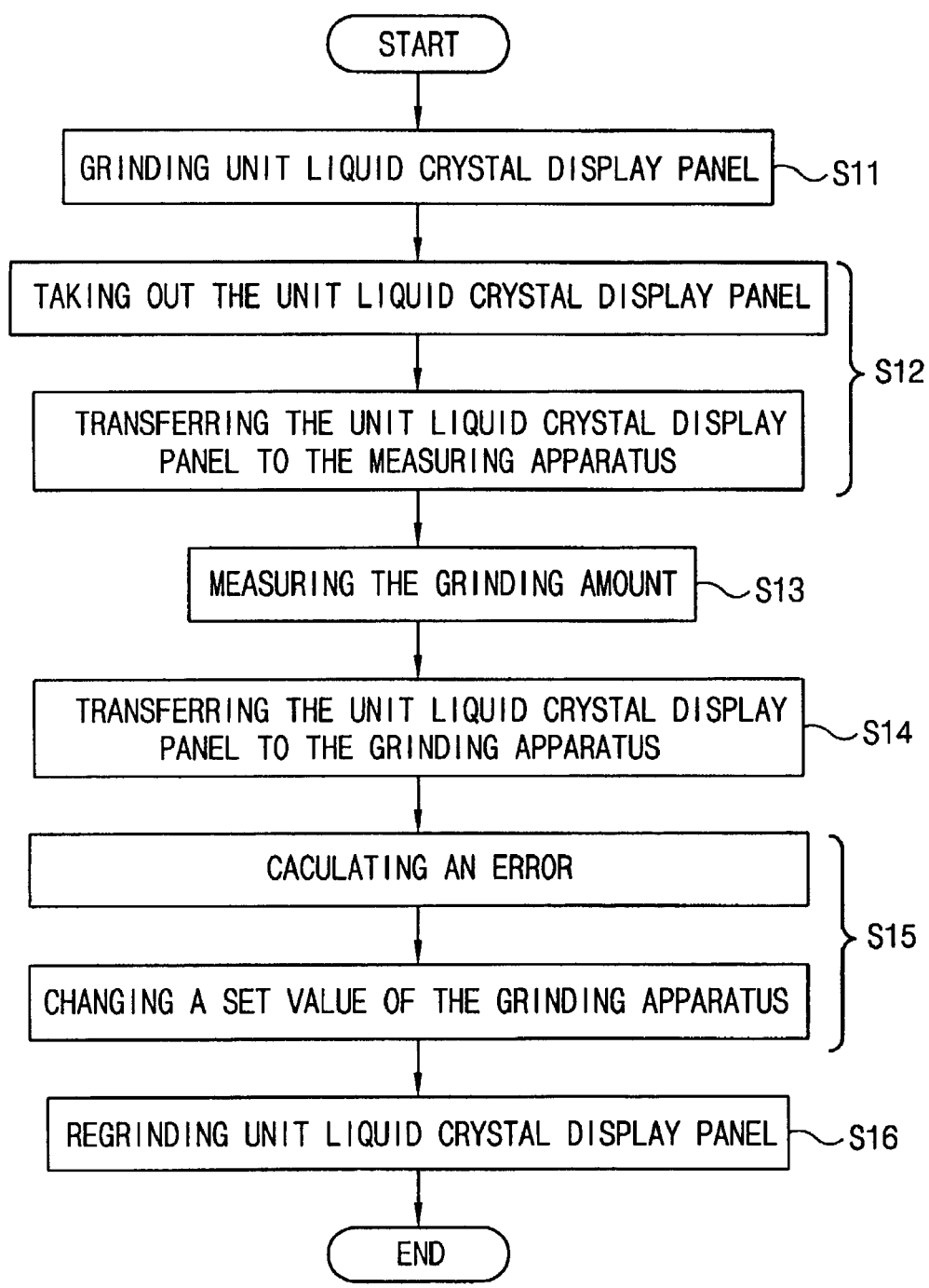
FIG. 4 is a flow chart illustrating a method for correcting a grinding amount of the unit liquid crystal display panel in FIG. 3.
Figure 5:
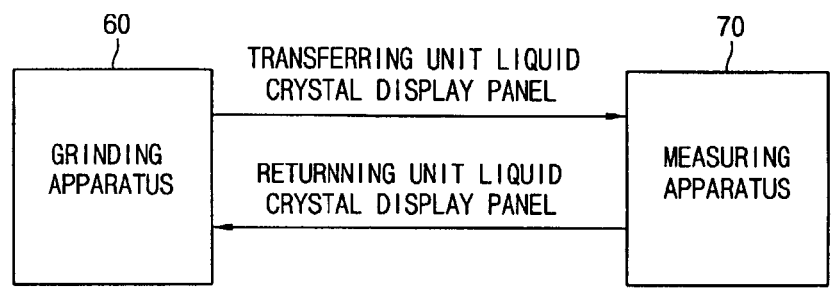
FIG. 5 is an exemplary view illustrating the related art grinding apparatus and measuring apparatus.
Figure 6:
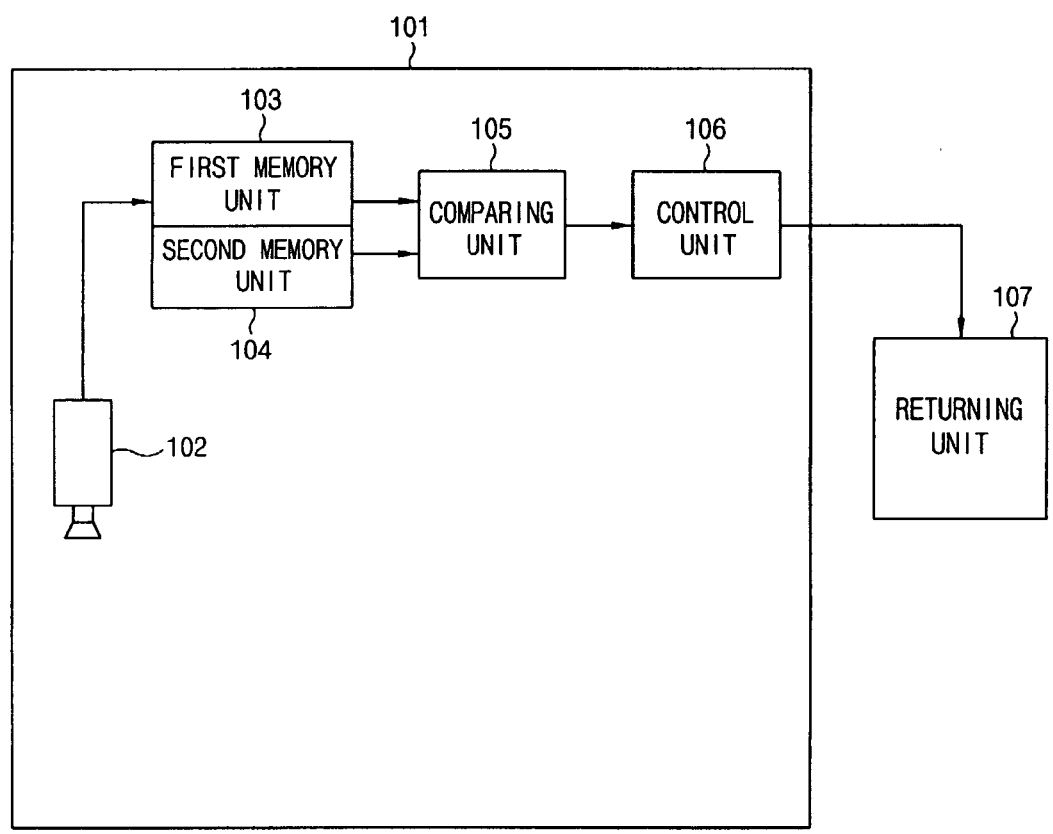
FIG. 6 is a block diagram illustrating an apparatus for correcting a grinding amount of a liquid crystal display panel in accordance with an embodiment of the present invention.

FIG. 6 is a block diagram illustrating an apparatus for correcting a grinding amount of a liquid crystal display panel in accordance with an embodiment of the present invention.

As shown in FIG. 6, the apparatus for correcting a grinding amount of a liquid crystal display panel in accordance with the exemplary embodiment includes a grinding unit 101 for grinding the edge of a unit liquid crystal display panel; a camera 102 disposed in the grinding unit 101 for recording grinding images along the ground edge of the unit liquid crystal display panel; a first memory unit 103 disposed in the grinding unit 101 storing the grinding pictures and a second memory unit 104 disposed in the grinding unit 101 storing a reference picture; a comparing unit 105 disposed in the grinding unit 101, comparing the grinding pictures with the reference picture respectively stored in the first and second memory units 103, 104; and a control unit 106 disposed in the grinding unit 101, changing a set value of the grinding unit 101 according to an error value of the comparing unit 105, returning the unit liquid crystal display device to the grinding apparatus via a returning unit 107, and controlling the grinding unit 101 to regrind the unit liquid crystal display panel.

Hereinafter, the operation of the apparatus for correcting a grinding amount of a liquid crystal display panel in accordance with the exemplary embodiment of the present invention will be described in detail.

First, the edge of the unit liquid crystal display panel is ground in the grinding unit 101. Herein, a long side and a short side of the unit liquid crystal display panel can be simultaneously ground by one grinding unit or a long side and a short side are ground respectively by different grinding units.

The camera 102 records images, e.g., photographs or records digital images, the grinding surface along an edge of the unit liquid crystal display panel and extracts the grinding picture. In more detail, the camera 102 aligns with the unit liquid crystal display panel through an alignment mark (not shown) formed thereon, photographs the grinding surface thereof and extracts the grinding picture. In the meantime, because the camera 102 aligns with the unit liquid crystal display panel through the alignment mark, an error between an actual grinding surface of the unit liquid crystal display panel and the grinding picture can be minimized.

The first memory unit 103 stores the grinding picture, and the second memory unit 104 stores the reference picture. Herein, it is preferable to store in advance a reference picture of an optimum grind of the unit liquid crystal display panel.

The comparing unit 105 compares the grinding picture with the reference picture respectively stored in the first and second memory units 103, 104 and calculates an error value.

The control unit 106 changes a set value of the grinding unit 101 according to the error value of the comparing unit 105 and controls the grinding unit 101 to regrind the unit liquid crystal display panel.

When the camera 102, the first memory unit 103, the second memory unit 104, the comparing unit 105 and the control unit 106 are disposed in the grinding unit 101, there is no need to remove, transfer or return a unit liquid crystal display panel to or from the grinding apparatus. Thus the operation can be simplified; reliability about correcting a grinding amount of the unit liquid crystal display panel can be improved, and the unit liquid crystal display panel can be protected from external impact.

In addition, when the camera 102, the first memory unit 103, the second memory unit 104, the comparing unit 105 and the control unit 106 are in the grinding unit 101, in order to operate them, it is preferable to install a "grinding amount automatic correction" button and an "execution" button on the outer surface of the grinding unit 101. In that case, when the worker clicks the "grinding amount automatic correction" button, the camera 102, the first memory unit 103, the second memory unit 104 and the comparing unit 105 are operated, and an error value between a grinding picture and a reference picture is displayed on a screen. When the worker clicks the "execution" button, the control unit 106 is operated, and the unit liquid crystal display panel is reground by correcting the grinding amount of the unit liquid crystal display panel.

In the meantime, FIG. 7 is a flow chart illustrating a method for correcting a grinding amount of a liquid crystal display panel in accordance with an exemplary embodiment of the present invention. As shown in FIG. 7, the method for correcting a grinding amount of a liquid crystal display panel in accordance with the embodiment of the present invention includes grinding the edge of a unit liquid crystal display panel in a grinding unit as shown at step S21; extracting grinding pictures along the edge of the unit liquid crystal display panel as shown at step S22; calculating an error value by comparing the grinding pictures with the reference picture as shown at step S23; and setting a set value of the grinding unit according to the error value and regrinding the unit liquid crystal display panel as shown at step S24.

Each step (S21 to S24) of the method for correcting a grinding amount of a liquid crystal display panel has been described with reference to the operation of the apparatus for correcting the grinding amount of the liquid crystal display panel shown in FIG. 6.

In more detail, in the grinding step S21, a long side and a short side of the unit liquid crystal display panel can be simultaneously ground by one grinding unit or a long side and a short side are ground respectively by different grinding units.

In the grinding picture extracting step S22, a camera disposed in the grinding unit photographs of records an image of the grinding surface along the edge of the unit liquid crystal display panel and extracts the grinding picture. In more detail, the camera 102 aligns with the unit liquid crystal display panel through an alignment mark (not shown) formed thereon, photographs the grinding surface thereof and extracts the grinding picture. In the meantime, because the camera aligns with the unit liquid crystal display panel through the alignment mark, an error between an actual grinding surface of the unit liquid crystal display panel and the grinding picture photographing the actual grinding surface can be minimized.

In the error value calculating step S23, an error value is calculated by the comparing unit comparing the grinding picture stored in the first memory unit with the reference picture stored in the second memory unit.

In the regrinding step S24, the control unit changes the set value of the grinding unit according to the error value and controls the grinding unit to regrind the unit liquid crystal display panel.

As illustrated in FIG. 8, according to another embodiment of the present invention, not only is a single unit liquid crystal panel reground if it is found to be ground insufficiently as a result of comparing the picture of the ground unit liquid crystal display panel and the reference picture, but the grinding amount for grinding subsequent unit liquid crystal display panels can be reset based on the single unit liquid crystal display panel correction amount.

FIG. 8 is a flow chart illustrating a method for correcting a grinding amount of a liquid crystal display panel in accordance with another exemplary embodiment of the present invention. As shown in FIG. 8, the method for correcting a grinding amount of a liquid crystal display panel in accordance with the embodiment of the present invention includes grinding the edge of a unit liquid crystal display panel in a grinding unit as shown at step S31; extracting grinding pictures along the edge of the unit liquid crystal display panel as shown at step S32; judging whether there is an error by comparing the grinding pictures with the reference picture as shown at step S33; and passing the ground liquid crystal display panel out of the grinding apparatus if no error is found. If an error is found, the method continues with calculating an error value S34; resetting a set value of the grinding unit according to the error value S35; regrinding the unit liquid crystal display panel S36; extracting the grinding picture S37 and judging whether there is an error by comparing the grinding pictures with the reference picture S38. If no error is found, the reground unit liquid crystal display panel is passed out of the grinding apparatus. If an error is found, the unit liquid crystal display panel is processed through steps S34 to S38 again. Also, if the grinding amount is reset for a single unit liquid crystal display panel in a plurality of unit liquid crystal display panels of the same size to be ground, the reset grinding amount can be fed back to the start of the process so that all subsequent unit liquid crystal display panels of the same size to be ground can be ground correctly initially.

Each step (S31 to S38) of the method for correcting a grinding amount of a liquid crystal display panel has been described with reference to the operation of the apparatus for correcting the grinding amount of the liquid crystal display panel shown in FIG. 6.

In more detail, in the grinding step S31, a long side and a short side of the unit liquid crystal display panel can be simultaneously ground by one grinding unit or a long side and a short side are ground respectively by different grinding units.

In the grinding picture extracting step S32, a camera disposed in the grinding unit photographs of records an image of the grinding surface along the edge of the unit liquid crystal display panel and extracts the grinding picture. In more detail, the camera 102 aligns with the unit liquid crystal display panel through an alignment mark (not shown) formed thereon, photographs the grinding surface thereof and extracts the grinding picture. In the meantime, because the camera aligns with the unit liquid crystal display panel through the alignment mark, an error between an actual grinding surface of the unit liquid crystal display panel and the grinding picture photographing the actual grinding surface can be minimized.

In the error value calculating step S34, an error value is calculated by the comparing unit comparing the grinding picture stored in the first memory unit with the reference picture stored in the second memory unit.

In the resetting the grinding amount step S35 and the regrinding step S36, the control unit changes the set value of the grinding unit according to the error value and controls the grinding unit to regrind the unit liquid crystal display panel, respectively. As described above, in the apparatus and the method for correcting the grinding amount of the liquid crystal display panel in accordance with the present invention, by extracting a grinding image of a grinding surface of a unit liquid crystal display panel by using a camera disposed in a grinding apparatus, comparing it with a reference image and controlling a grinding unit to regrind the unit liquid crystal display panel as the error value, there is no need to remove, transfer or return the unit liquid crystal display panel to or from the grinding apparatus. Accordingly it is possible to simplify the operation, improve reliability about correcting a grinding amount thereof and protect the unit liquid crystal display panel from outer impacts.

In addition, by disposing a grinding amount correcting apparatus in a grinding apparatus, correcting a grinding amount of a unit liquid crystal display panel can be performed by an automatic system, and accordingly inconvenience of a worker can be solved, and error occurrence in grinding amount correcting of the unit liquid crystal display panel can be minimized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for correcting a grinding amount of a liquid crystal display panel, comprising:

forming an alignment mark on an edge of an unit liquid crystal display panel;

aligning a camera with the unit liquid crystal display panel using the alignment mark on the edge of the unit liquid crystal display panel, to minimize an error between an actual grinding surface of the unit liquid crystal display panel and a grinding picture;

grinding the edge of the unit liquid crystal display panel;

generating grinding pictures of the unit liquid crystal display panel using the camera and storing the grinding pictures on a first memory unit;

calculating an error value of a grinding amount by comparing the grinding pictures with a reference picture stored on a second memory unit;

changing a set value of a grinding unit according to the error value; and regrinding the unit liquid crystal display panel after changing the set value.

2. The method of claim 1, wherein generating grinding pictures of the unit liquid crystal display panel is performed by photographing of a camera.

3. The method of claim 1, wherein the unit liquid crystal display panel includes a color filter substrate on a thin film transistor array substrate.

* * * * *